United States Patent [19]

Combes et al.

[11] Patent Number: 4,748,587
[45] Date of Patent: May 31, 1988

[54] DEVICE FOR IMPROVING DETECTION OF UNOPERATIONAL STATES IN NON-ATTENDED DRIVEN PROCESSOR

[75] Inventors: Jacques Combes, La Colle sur Loup; Jean-Claude Robbe, Cagnes sur Mer; Paul Viallon, Vence, all of France

[73] Assignee: International Business Machines Corp., Armonk, N.Y.

[21] Appl. No.: 801,442

[22] Filed: Nov. 25, 1985

[30] Foreign Application Priority Data

Dec. 31, 1984 [EP] European Pat. Off. ........ 84430050.9

[51] Int. Cl.⁴ ............................................ G06F 11/34
[52] U.S. Cl. .................................................. 364/900
[58] Field of Search ... 364/200 MS File, 900 MS File

[56] References Cited

U.S. PATENT DOCUMENTS 4,408,328 10/1983 Wakai ................................... 371/62
4,475,156 10/1984 Federico et al. ..................... 364/300
4,517,644 5/1985 Hamada et al. ...................... 364/200

Primary Examiner—Gareth D. Shaw
Assistant Examiner—Christina M. Eakman
Attorney, Agent, or Firm—John B. Frisone

[57] ABSTRACT

Device for detecting the unoperational states of an interrupt driven processor executing instructions on n priority levels, n−1 being the lowest priority level and 0 the highest priority level. It comprises means (18) for dispatching the unoperational state detection task running on the n−1 priority level at time intervals smaller than a specified time-out delay. A detection timer (1) is set at an initial value each time the task is dispatched and the content is changed stepwise once the task has been dispatched and an interval timer (13) having a minimum step value. Means (20) are responsive to the final value taken by the detection timer when the time-out delay has elapsed, to send a level 0 interrupt to the processor. A REMEMBER LATCH (26) is set at the occurrence of the first next pulse from the interval timer if the detection timer is at its final value and is reset when the level 0 interrupt handling succeeds in restoring the cause of said level 0 interrupt request.

3 Claims, 5 Drawing Sheets

DEVICE FOR IMPROVING DETECTION OF UNOPERATIONAL STATES IN NON-ATTENDED DRIVEN PROCESSOR

FIELD OF THE INVENTION

This invention relates to a device which allows any kind of failure which leads to an unoperational state of a processor to be detected in a short delay.

BACKGROUND ART

Service processors attached to computers are more and more frequently used for initialization, incident recording and maintenance purposes.

A description of such an arrangement of a service processor and a computer system may be found in U.S. Pat. No. 4,268,902 assigned to the same assignee, filed on Oct. 23, 1978, and entitled "Maintenance interface for a service processor-central processing unit computer system".

The Communications Controller IBM 3725 is also provided with a service processor.

In such a controller, only a fraction of the microcode malfunctions leading to an unoperational state of the service processor is detected, the hardware failures which also lead to an unoperational state of the processor are never explicitly detected. As this controller may be part of a system such as a telecommunication network, detecting the unavailability of the service processor is a key factor for the reliability of the whole system, specially the telecommunication network. An object of the invention is a device which allows any kind of failure : i.e. microcode and hardware failures occurring in a processor to be detected as soon as possible.

Another object of this invention is to provide such a device which is simple and requires only little additional hardware

SUMMARY OF THE INVENTION

The device according to the invention is used for detecting the unoperational states of an interrupt driven processor executing instructions on one of n priority levels, n−1 being the lowest priority level and 0 the highest priority level.

It comprises means (18) for dispatching an unoperational state detection task running on the n−1 priority level at time intervals smaller than a specified time-out delay. A detection timer (1) is set at an initial value equal to the time-out delay and its content is changed stepwise through clocking means (9). The detection timer is set at said initial value, each time the unoperational state detection task is dispatched. An interval timer (13) provides pulses having a minimum step value. Means (20) are responsive to the final value taken by the detection timer when the time-out delay has elapsed to send a level 0 interrupt to the processor. A memorizing means (26) is set at the occurrence of the first next pulse from the interval timer if the detection timer is at its final value and is reset when the level 0 interrupt handling succeeds in restoring the cause of said level 0 interrupt request.

The device further comprises means (30, 32) for testing the memorizing means at the second next pulse from the interval timer (13) and generating a signal which is active to indicate that the processor is unoperational when the memorizing means (26) is still set at that time.

DETAILED DESCRIPTION OF THE INVENTION

The device according to the invention may be incorporated in any interrupt driven processor. For example, it may be included in the service processor of the IBM 3725 Communications Controller. Reference is made to the publication IBM 3725 Communications Controller Development ISBN-0-933/86-06-1 which gives an overview of each part of the controller. As described in the above referenced publication, the service processor of the IBM 3725 Communications Controller, called the Maintenance and Operator Subsystem MOSS, is mainly used for initial program loading, general maintenance, detection and recording of errors and problem determination in the controller.

Figure 1:
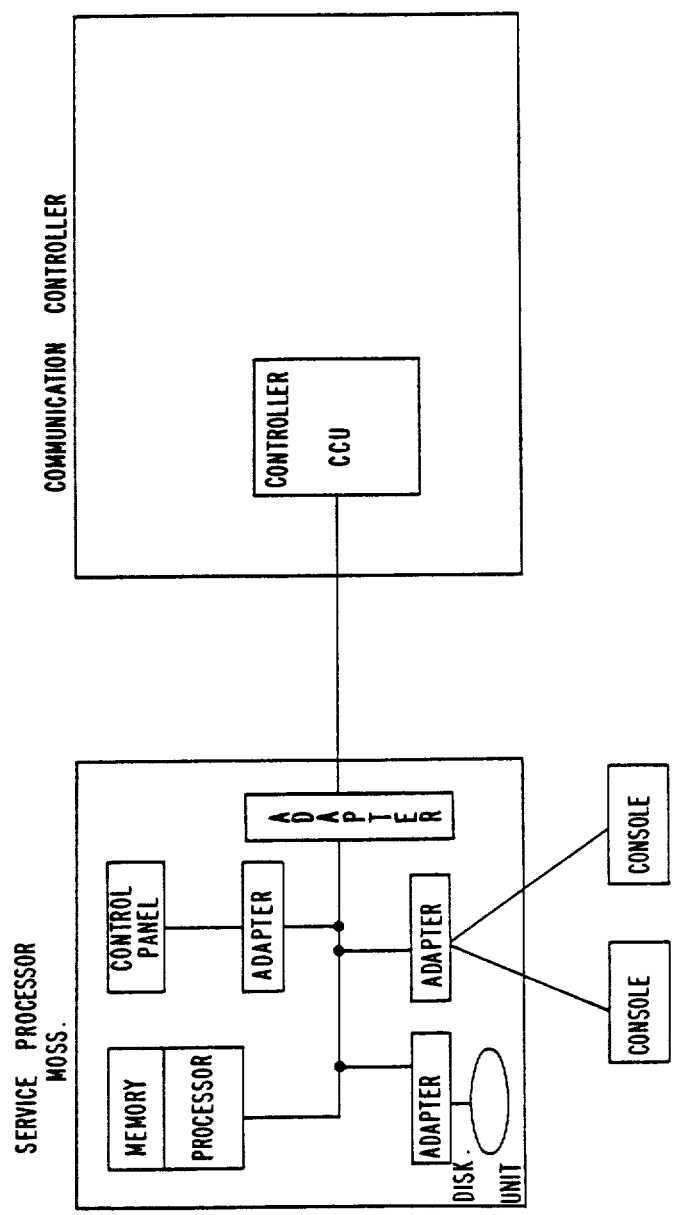
FIG. 1 represents the general arrangement of the service processor in the IBM. 3725 Communications Controller.

As shown in FIG. 1, the MOSS hardware comprises an interrupt driven processor associated with a memory containing the MOSS microcode. A number of adapters allows the communication between the MOSS processor and external units such as the controller central control unit CCU, a diskette unit, operator consoles and a control panel. The user communicates with the MOSS by means of the operator consoles or the control panel.

The device according to the invention is based on the existence of interrupt levels in the processor, which are driven either by external events from adapters of by microcode itself.

In the processor, the service functions are organized as application tasks supported by the processor microcode.

The microcode is executed on eight interrupt levels which are described in the above referenced publication. The processor executes instructions, at a given time, on one of the eight different levels of priority. The tasks having the lowest priority are run on level 7 and the tasks having higher priorities are run on levels 6, 5, 4... up to level 0 which corresponds to the highest priority and is thus reserved for the error detection and handling.

Figure 2:
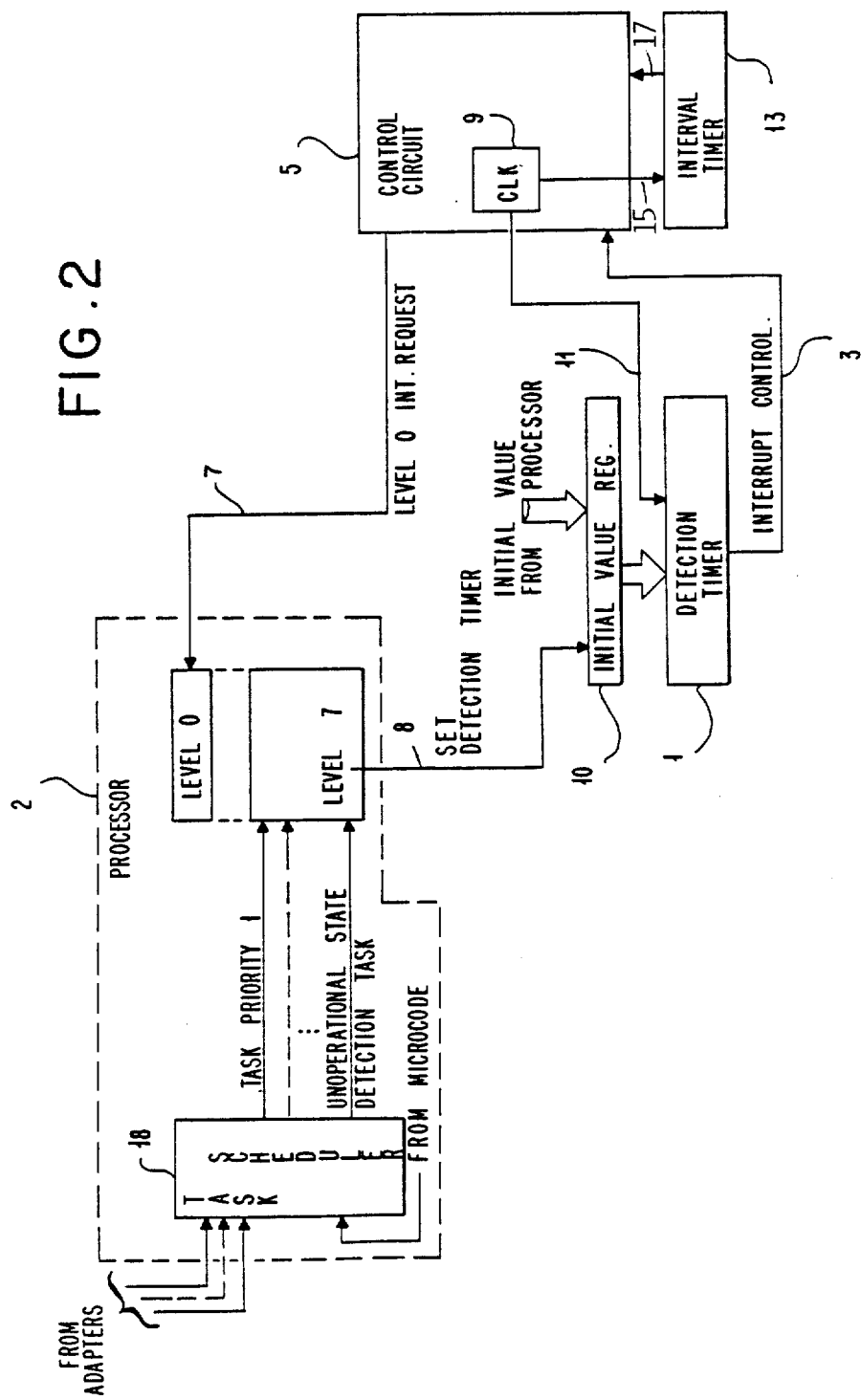
FIG. 2 represents the device for detecting the service processor malfunctions according to the present invention.

The device of the invention is shown in FIG. 2. It comprises detection timer 1 which is a high resolution hardware timer. As schematically represented, this timer is controlled and set by the processor microcode. A specific task run on level 7 and having the lowest priority of all the tasks run at this level, is dispatched at regular time intervals lower than the time-out delay. The dispatching of this task causes the interval timer to be set at a given initial value. Once set at its initial value, the detection timer content is changed stepwise. If the dispatching of the task does not occur before the end of the time-out delay which has to be set for each kind of processor according to its specification, the final content of detection timer 1 at the end of the time-out delay is detected and causes a level 0 interrupt request to be made to the processor.

In the preferred embodiment of the invention, the specific task called unoperational state detection task causes the timer to be set at an initial value ranging between a minimum step value of one microsecond to several hours and chosen equal to the time-out delay which has to be set for every kind of processor according to its specification. The function of detection timer 1 will be described later on.

At each time interval equal to the minimum step value, detection timer 1 once set to its initial value decrements its content. If the content reaches zero, which means that the time-out delay fixed by the microcode has elapsed, the detection timer sends an interrupt cnotrol signal on line 3 to a logic control circuit 5. In response to the active interrupt control signal, control circuit 5 requests a level 0 interrupt to the processor 2 by activating output line 7.

Detection timer 1 is dedicated to this function alone, it cannot be used as usual interval timer. It works under control of a separate clock 9 which provides pulses having a period equal to the minimum step value on its output line 11. Using a separate clock allows the device of the invention to operate even if the processor clocks fail.

The device of the invention also comprises an interval timer 13. This timer may be the timer generally used in the microcoded processors for supervisory functions or may be a separate timer. It works with a minimum step value equal to several milliseconds and is connected to control circuit 5 by means of input line 15 and output line 17.

In processor 2, task scheduler 18 handles the various tasks which in the described application of the invention are running at level 7 and insures their dispatching in a conventional way, which means that a microcode routine gets control of the processor to execute the task.

Control circuit 5 is provided with output line 19 (see Fig. 3) on which a PROCESSOR DOWN signal is generated. This signal is made active to indicate that the processor is non-operational.

The device shown in FIG. 2 operates as follows. The processor is considered as operational when the non-operational state detection task running with the lowest priority level 7 is dispatched by task scheduler 18 of the processor at time intervals smaller than the time-out delay. The frequency at which dispatching of this task has to occur depends upon the processor specifications.

The unique function of this task is to set detection timer 1 to its initial value which in the preferred embodiment of the invention is equal to the time-out delay. Each time the task is dispatched, processor 2 sends a SET DETECTION TIMER control signal on line 8 which loads the time-out delay value stored in register 10, in detection timer 1. The initial value is loaded during the initial microcode loading operation in register 10 so that each time line 8 is made active during the execution of the microcode, the register content is transferred to detection timer 1. This action will also reset line 3 of detection timer 1.

Setting detection timer 1 to its initial value at every dispatching of the unoperational state detection task, prevents it from taking the zero value and consequently prevents a level 0 interrupt from being requested by control circuit 5 to the processor. The task can only be dispatched regularly if both the processor microcode and hardware are operational. Each time the task is dispatched, detection timer 1 is set to its initial value and a new processing and detection cycle starts.

The ratio between the time-out delay value and the time between two dispatchings of the unoperational state detection task can very from 2 to any limit fixed according to the specific processor load and environment.

Figure 3:
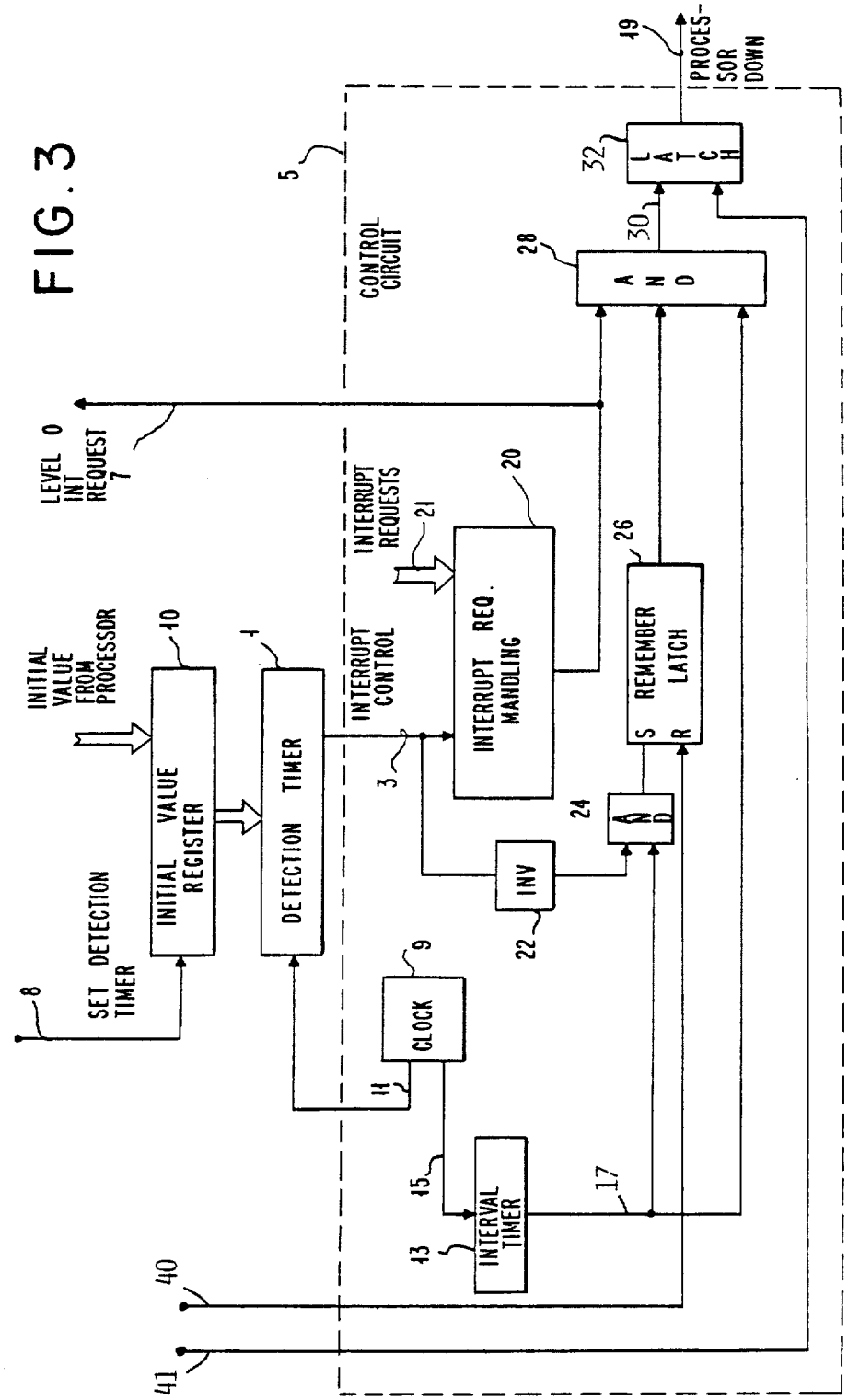
FIG. 3 represents control circuit 5 of FIG. 2.

Before describing the operation of the device of the invention, reference is made to FIG. 3 which represents a logic arrangement which is used for performing the function of control circuit 5.

Control circuit 5 is part of the control hardware of the processor which comprises interrupt request handling circuit 20. Circuit 20 receives all the interrupt requests on bus 21 and the interrupt control signal from output line 3 of detection timer 1. This signal is considered as a level 0 interrupt request when at zero level, so that it causes a level 0 interrupt request to be made to processor 2 by activating line 7 since the level 0 interrupt has the highest priority.

Clocking circuit CLK 9 has been represented as part of circuit 5, it generates the clock pulses which are provided to detection timer 1 through line 11 and to the interval timer through line 15. In a preferred embodiment of the invention the period of pulses provided to interval timer 13 is equal to 100 milliseconds.

Output line 3 of detection timer 1 is connected through inverter 22 to first input of AND gate 24 whose second input is connected to output 17 of interval timer 13. The output of AND gate 24 is connected to the SET input of REMEMBER latch 26 whose RESET input is connected to line 40.

AND gate 28 has a first input connected to line 7, a second input connected to the output of latch 26 and a third input connected to line 17 and provides on its output 30 a signal which is latched in latch 32 which has its RESET input connected to line 41.

The operation of the device of the invention as represented in FIGS. 2 and 3 will be described in reference to Figures 4 to 7.

Figure 4:
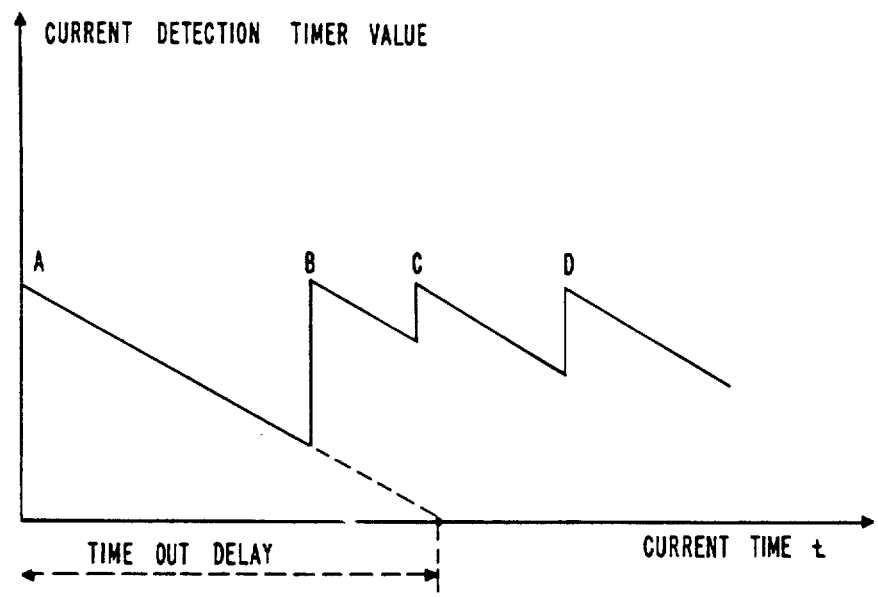
FIG. 4 represents the status of detection timer 1 of FIG. 2 when the service processor is operational.

FIG. 4 represents the content value of detection timer 1 as a function of time when the processor is operational. At time A, the processor initialization procedure sets detection timer 1 at its initial value and then, each time the non-operational state detection task is dispatched at times B, C, and D, detection timer is also set at its initial value. It is then decremented by one at each step value interval under control of clocking circuit 9. At times A, B, C and D latches 26 and 32 are reset.

Since a new dispatching of the non-operational state detection task occurs before the content of detection timer 1 reaches zero, the signal on line 3 is never at a low level so that AND gates 24 and 28 are not conditioned and latches 26 and 32 are not set. The signal on output line 19 of control circuit 5 is not made active.

Figure 5:
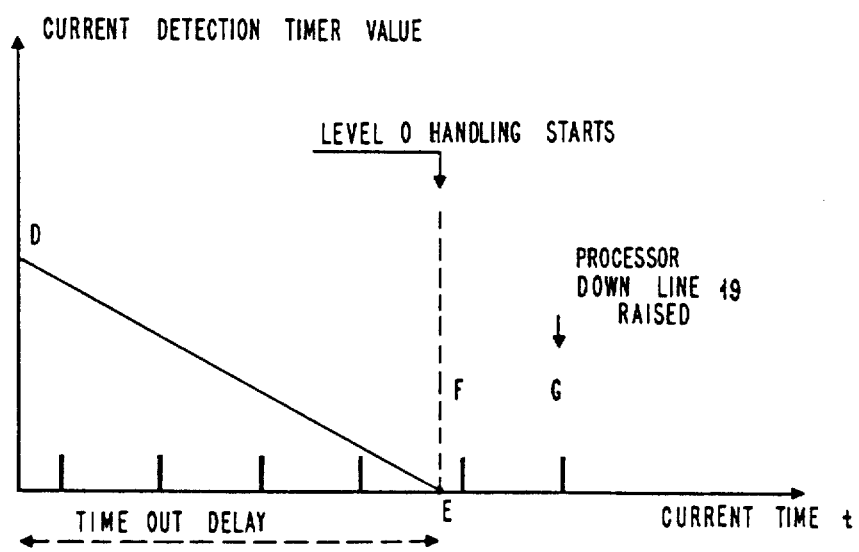
FIG. 5 represents the status of detection timer 1 of FIG. 2 when the service processor is unoperational and the recovery procedures do not succeed in restarting the service processor.

FIG. 5 represents the content value of detection timer 1 as a function of time, when the processor is unoperational. After the dispatching of the unoperational state detection task at time D, the task cannot be dispatched anymore due to any malfunction in the processor hardware or microcode. At time E, the detection timer content is equal to zero, the signal on line 3 is at a down level and control circuit 5 requests a 0 level interrupt on line 7 to processor 2. AND gate 24 is conditioned.

If the processor hardware or the microcode are no longer working, the level 0 handling routines do not succeed in resetting the cause of the interrupt request. At the next occurence of the pulse provided by interval timer 13 at time F, time-out REMEMBER latch 26 in control circuit 5 is set, since at that time AND gate 24 is conditioned. At the following occurrence of a pulse provided by the interval timer at time G, REMEMBER latch 26 is still found ON and the level 0 request has not been reset, AND gate 28 is conditioned and generates on its output 30, a signal which is active to indicate that the processor is unoperational. This signal is latched in latch 32 and line 19 provides the PROCESSOR DOWN indication.

In this case, the processor is considered as unoperational, since for a duration not smaller than the interval timer period, the microcode was not able to enter a recovery procedure.

Figure 6:
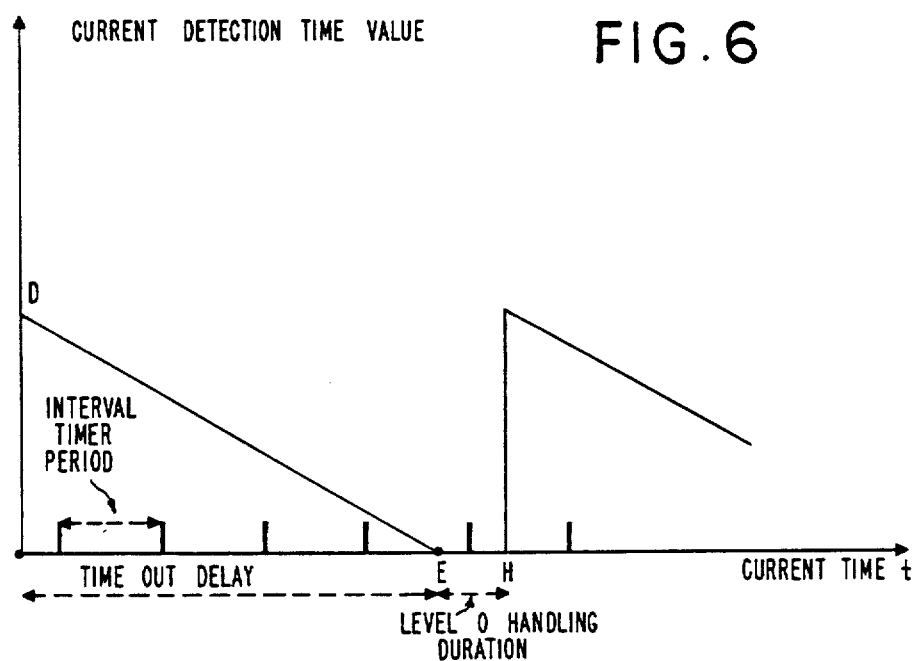
FIGS. 6 and 7 represent the status of detection timer 1 of FIG. 2 when the service processor is unoperational and the recovery procedures succeed in restarting the service processor.

FIG. 6 represents the content of detection timer 1, when the level 0 recovery procedure initiated when the detection timer content reaches zero, succeeds in re-starting processor 2. At time H, detection timer 1 is loaded to its initial value and REMEMBER latch 26 if already set is restored by line 40 under control of the processor. In that case, there is non non-operational state detection since the microcode was still able to handle the apparent malfunction and to restart a new cycle of error processing and detection. According to the environment, the event can be logged to signal the occurrence of a temporary overload of the system.

Figure 7:
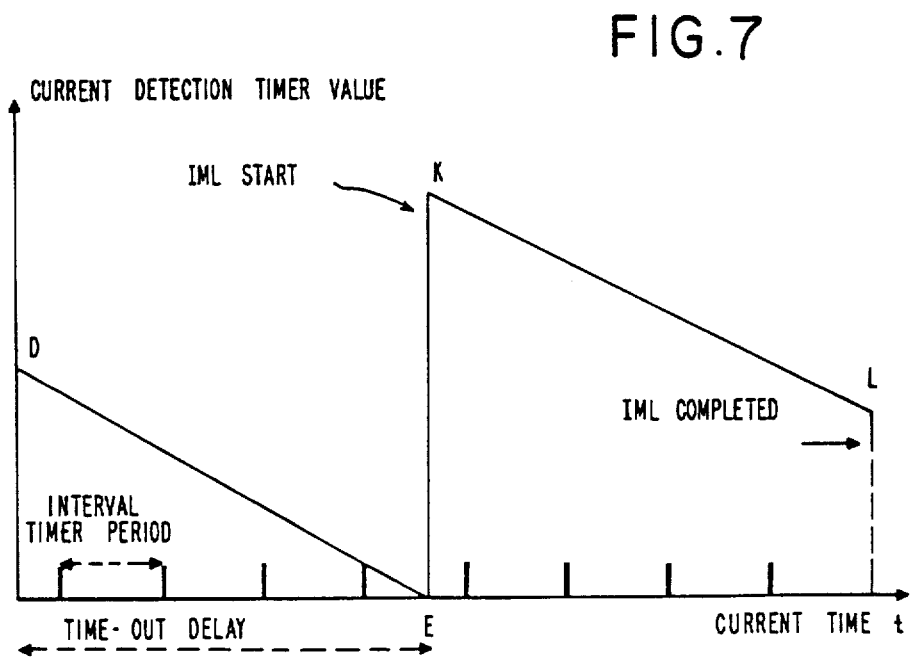

A count of these events can be maintained and upon reading a given threshold used as a criteria to enter a recovery procedure, as described in reference to FIG. 7.

As shown in FIG. 7, depending upon the criteria found by the microcode when handling the level 0 interrupt at time E, a complete recovery procedure is entered at time K, i.e., an initial microcode loading IML is performed and the detection timer is re-initialized to a different initial value which is two times the normal initial value and called IML time-out value. Remember latch 26 is not set at that time.

At the end of the IML operation at point L, if this operation is correctly completed, remember latch 26 is reset by line 40, detection timer 1 is loaded with the normal initial value, and the detection process is started as previously described.

If normal end of IML operation cannot be achieved because the initial error is persistent, the detection of this non-operational state is made based upon the IML initial value which is loaded in detection timer 1 which is regularly decremented until it reaches zero. The PROCESSOR DOWN signal is generated on line 19 as previously described in reference to FIG. 4. This signal will be reset, when the error is corrected at the end of the next IML by line 41 under control of the processor.

We claim:

1. In an interrupt driven processor executing instructions on n priority levels, a device for detecting the unoperational states due to any malfunctions of the processor characterized in that it comprises:

clock means independent of the processor, providing clock pulses having a minimum step value;

means (18) for dispatching an unoperational state detection task running on the lowest priority level at time intervals smaller than a specified time out delay;

a detection timer (1) set at a first initial value by said processor each time the task is dispatched and responsive to the clock pulses which cause the value contained in the detection timer to be changed stepwise;

means (20) responsive to a predetermined threshold value provided by the detection timer to generate a processor interrupt request at the highest priority level, indicative that the task has not been dispatched within a time out delay corresponding to the predetermined threshold value provided by the detection times;

an interval timer (13) responsive to the clock pulses for providing output pulses having a period equal to at least the minimum step value;

gating means (22,24) responsive to the predetermined threshold provided by the detection timer and to the pulses from the interval timer to gate at an output, the pulses provided by the interval timer;

memory means (26) connected to the output of the gating means and responsive to the gated pulses from the interval timer for setting said memory means to a first state upon the occurrence of the first pulse from the interval timer, following the detection timer attaining the predetermined threshold value and being reset to a second state when the highest priority interrupt handling succeeds in correcting the malfunctions which have prevented the unoperational state detection task from being dispatched; and power down indicating means (28,32) responsive to the first state of the memory means and to the interval timer output pulses to provide a signal indicating that the processor is non-operational when the memory means is at the first state at the occurrence of another output pulse from the interval timer following the detection timer reaching the said predetermined threshold value.

2. A device according to claim 1 in which the processor:

executes an initial program load at the highest priority level after receipt of a predetermined plurality of interrupt request;

sets the initial value of the detection timer to a second value which is greater than the said first value; and resets the said memory means at the conclusion of an initial program load in the event that the processor has not received a subsequent interrupt request.

3. Device according to claim 2, characterized in that the memorizing means is a set/reset latch (26).

* * * * *